United States Patent
Roberts et al.

(10) Patent No.: US 12,091,191 B2
(45) Date of Patent: Sep. 17, 2024

(54) AIRCRAFT CARGO HANDLING SYSTEM ARCHITECTURE

(71) Applicant: GOODRICH CORPORATION, Charlotte, NC (US)

(72) Inventors: Aaron J Roberts, Jamestown, ND (US); Scott Harms, Ypsilanti, ND (US); Shad Kish, Jamestown, ND (US); Dustin Paul Scheer, Jamestown, ND (US); Wesley K Stegmiller, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 757 days.

(21) Appl. No.: 17/239,423

(22) Filed: Apr. 23, 2021

(65) Prior Publication Data

US 2021/0237877 A1 Aug. 5, 2021

Related U.S. Application Data

(62) Division of application No. 16/191,561, filed on Nov. 15, 2018, now Pat. No. 11,014,672.

(51) Int. Cl.
*B64D 9/00* (2006.01)
*B65G 43/00* (2006.01)
(Continued)

(52) U.S. Cl.
CPC ............... *B64D 9/00* (2013.01); *B65G 43/00* (2013.01); *B60P 1/52* (2013.01); *B64D 2009/006* (2013.01); *B65G 13/02* (2013.01); *B65G 2201/0235* (2013.01); *B65G 2201/0267* (2013.01); *B65G 2203/0233* (2013.01)

(58) Field of Classification Search
CPC .......... B64D 9/00; B65G 43/00; B65G 13/02; B60P 1/52
See application file for complete search history.

(56) References Cited

U.S. PATENT DOCUMENTS 5,285,887 A 2/1994 Hall
6,253,909 B1 7/2001 Kalm et al.
(Continued)

FOREIGN PATENT DOCUMENTS

DE 102010035099 2/2012
EP 3650344 5/2020

OTHER PUBLICATIONS

European Patent Office, European Office Action dated Sep. 27, 2023 in Application No. 19209147.8.
(Continued)

*Primary Examiner* — Kyle O Logan
(74) *Attorney, Agent, or Firm* — SNELL & WILMER L.L.P.

(57) ABSTRACT

A cargo handling system includes a conveyance surface; a first power drive unit having a first drive roller, a first restraint device; one or more sensors configured to provide positional data corresponding to a current location of a unit load device on the conveyance surface; and a first power drive unit agent configured for communication with the one or more sensors, the first power drive unit agent configured to selectively activate and deactivate the first drive roller and the first restraint device based on the positional data.

3 Claims, 7 Drawing Sheets

(51) Int. Cl.
*B60P 1/52* (2006.01)
*B65G 13/02* (2006.01)

(56) References Cited

U.S. PATENT DOCUMENTS

| | | | |
|---|---|---|---|
| 7,014,038 B2 | 3/2006 | Leingang et al. | |
| 8,220,750 B2 * | 7/2012 | Hettwer | B64D 9/00 |
| | | | 244/137.1 |
| 8,925,867 B2 | 1/2015 | Schnörwangen et al. | |
| 9,014,840 B2 | 4/2015 | Scherenberger et al. | |
| 9,932,112 B1 | 4/2018 | Harms et al. | |
| 10,173,841 B1 | 1/2019 | Ramalingam et al. | |
| 10,432,127 B1 | 10/2019 | Harms | |
| 2008/0308390 A1 | 12/2008 | Stegmiller | |
| 2008/0310944 A1 | 12/2008 | Stegmiller | |
| 2009/0105874 A1 | 4/2009 | Tietjen | |
| 2009/0121084 A1 | 5/2009 | Hettwer | |
| 2009/0121085 A1 * | 5/2009 | Hettwer | B64D 9/00 |
| | | | 244/137.1 |
| 2010/0100225 A1 | 4/2010 | Reed | |
| 2010/0213313 A1 | 8/2010 | Reed | |
| 2011/0313563 A1 | 12/2011 | Huber | |
| 2011/0313564 A1 * | 12/2011 | Schnorwangen | B64D 9/00 |
| | | | 700/214 |
| 2012/0275485 A1 | 11/2012 | Holzner | |
| 2013/0158700 A1 * | 6/2013 | Scherenberger | B64F 1/32 |
| | | | 700/213 |
| 2013/0159205 A1 | 6/2013 | Schnorwangen | |
| 2013/0166063 A1 * | 6/2013 | Panzram | B65G 67/00 |
| | | | 700/229 |
| 2015/0251855 A1 | 9/2015 | Roberts | |
| 2017/0015503 A1 | 1/2017 | Harms | |
| 2018/0056848 A1 | 3/2018 | Koehler | |
| 2019/0210727 A1 | 7/2019 | Harms | |
| 2019/0256211 A1 * | 8/2019 | Murthy | B64D 9/003 |
| 2019/0256227 A1 | 8/2019 | Balasu Braman Ian | |
| 2020/0140088 A1 | 5/2020 | Harms | |
| 2020/0156792 A1 | 5/2020 | Scheer | |
| 2020/0223639 A1 | 7/2020 | Saini | |

OTHER PUBLICATIONS

European Patent Office, European Search Report dated Mar. 18, 2020 in Application No. 19209147.8.
USPTO, Pre-Interview First Office Action dated Sep. 25, 2020 in U.S. Appl. No. 16/191,561.
USPTO, First Action Interview Office Action dated Nov. 17, 2020 in U.S. Appl. No. 16/191,561.
European Patent Office, European Office Action dated Mar. 26, 2021 in Application No. 19209147.8.
USPTO, Notice of Allowance dated Jan. 26, 2021 in U.S. Appl. No. 16/191,561.
European Patent Office; European Office Action dated Mar. 31, 2022 in Application No. 19209147.8.

* cited by examiner

AIRCRAFT CARGO HANDLING SYSTEM ARCHITECTURE

CROSS-REFERENCE TO RELATED APPLICATIONS

This application is a divisional of, and claims priority to and the benefit of, U.S. application Ser. No. 16/191,561, filed Nov. 15, 2018 and entitled "AIRCRAFT CARGO HANDLING SYSTEM ARCHITECTURE," which is incorporated herein by reference in its entirety for all purposes.

FIELD

The present disclosure relates generally to cargo handling systems and, more particularly, to power drive units and control systems used to transport cargo in cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include roller trays containing transport rollers that support and transport the containerized cargo or pallets. Motor driven rollers are typically employed in these systems. In certain aircraft, a plurality of motor driven power drive units (PDUs) is used to propel the containers or pallets within the cargo compartment. This configuration facilitates transportation of the containers or pallets within the cargo compartment by one or more operators or agent-based systems controlling operation of the PDUs.

SUMMARY

A cargo handling system is disclosed. In various embodiments, the cargo handling system includes a conveyance surface; a first power drive unit having a first drive roller; a first restraint device; one or more sensors configured to provide positional data corresponding to a current location of a unit load device on the conveyance surface; and a first power drive unit agent configured for communication with the one or more sensors, the first power drive unit agent configured to selectively activate and deactivate the first drive roller and the first restraint device based on the positional data.

In various embodiments, a second power drive unit is includes and a second power drive unit agent is configured for communication with the one or more sensors, the second power drive unit agent being configured to selectively activate and deactivate a second drive roller based on the positional data. In various embodiments, a second restraint device is included and the second power drive unit agent is configured to selectively activate and deactivate the second drive roller and the second restraint device based on the positional data.

In various embodiments, a wireless network is configured to connect a wireless mobile operator interface device to the first power drive unit agent. In various embodiments, a second power drive unit is includes and a second power drive unit agent is configured for communication with the one or more sensors and with the wireless mobile operator interface device. In various embodiments, the wireless network comprises a wireless relay configured to connect the wireless mobile operator interface device and the first power drive unit agent and the second power drive unit agent. In various embodiments, at least one of a power line communication bus and a controller area network bus is configured to connect the wireless relay to the first power drive unit agent and the second power drive unit agent.

In various embodiments, an alternating-to-direct current conversion module is configured to provide a first source of direct current to the first power drive unit agent and the second power drive unit agent. In various embodiments, the alternating-to-direct current conversion module is configured to provide a second source of direct current to a wireless network.

In various embodiments, a power and communication interface is configured to receive maintenance data from the first power drive unit agent and the second power drive unit agent. In various embodiments, the power and communication interface is configured to receive the maintenance data and a source of alternating current over a combined power and data bus. In various embodiments, a wireless network is configured to connect a wireless mobile operator interface device to the first power drive unit agent and to the second power drive unit agent.

A method for storing and restraining cargo is disclosed. In various embodiments, the method includes the steps of generating a first goal location to store and restrain a first cargo; transmitting the first goal location to a plurality of power drive unit agents associated with a plurality of power drive units; transmitting sensor data regarding a current location of the first cargo to the plurality of power drive unit agents; activating by one or more of the plurality of power drive unit agents a first drive roller associated with a first one of the plurality of power drive units to move the first cargo toward the first goal location; sequentially activating subsequent drive rollers associated with subsequent ones of the plurality of power drive units to move the first cargo to the first goal location; and activating by one or more of the plurality of power drive unit agents a first restraint device to restrain the first cargo to the first goal location.

In various embodiments, the method further includes generating a second goal location to store and restrain a second cargo; transmitting the second goal location to the plurality of power drive unit agents; activating by one or more of the plurality of power drive unit agents a first drive roller associated with a first one of the plurality of power drive units to move the second cargo toward the second goal location; sequentially activating drive rollers associated with the plurality of power drive units to move the second cargo to the second goal location; and activating by one or more of the plurality of power drive unit agents a second restraint device to restrain the second cargo to the second goal location. In various embodiments, the step of transmitting the first goal location to the plurality of power drive unit agents associated with the plurality of power drive units includes a wireless network configured to connect a wireless mobile operator interface device and the plurality of power drive unit agents.

A system for storing and restraining cargo on a cargo deck is disclosed. In various embodiments, the system includes a conveyance surface positioned proximate the cargo deck; a plurality of power drive units, each having associated therewith a drive roller; a plurality of restraint devices; one or more sensors configured to provide positional data corresponding to a current location of a unit load device on the conveyance surface; and a plurality of power drive unit agents configured for communication with the one or more sensors, the plurality of power drive unit agents configured to selectively activate and deactivate the drive roller associated with each of the plurality of power drive units and the plurality of restraint devices based on the positional data.

In various embodiments, a wireless network is configured to connect a wireless mobile operator interface device to the plurality of power drive unit agents. In various embodiments, the wireless network comprises a wireless relay configured to connect the wireless mobile operator interface device and the plurality of power drive unit agents via at least one of a power line communication bus and a controller area network bus.

In various embodiments, an alternating-to-direct current conversion module is configured to provide a first source of direct current to the plurality of power drive unit agents and a second source of direct current to the wireless network. In various embodiments, a power and communication interface is configured to receive maintenance data from the plurality of power drive unit agents and a source of alternating current over a combined power and data bus.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
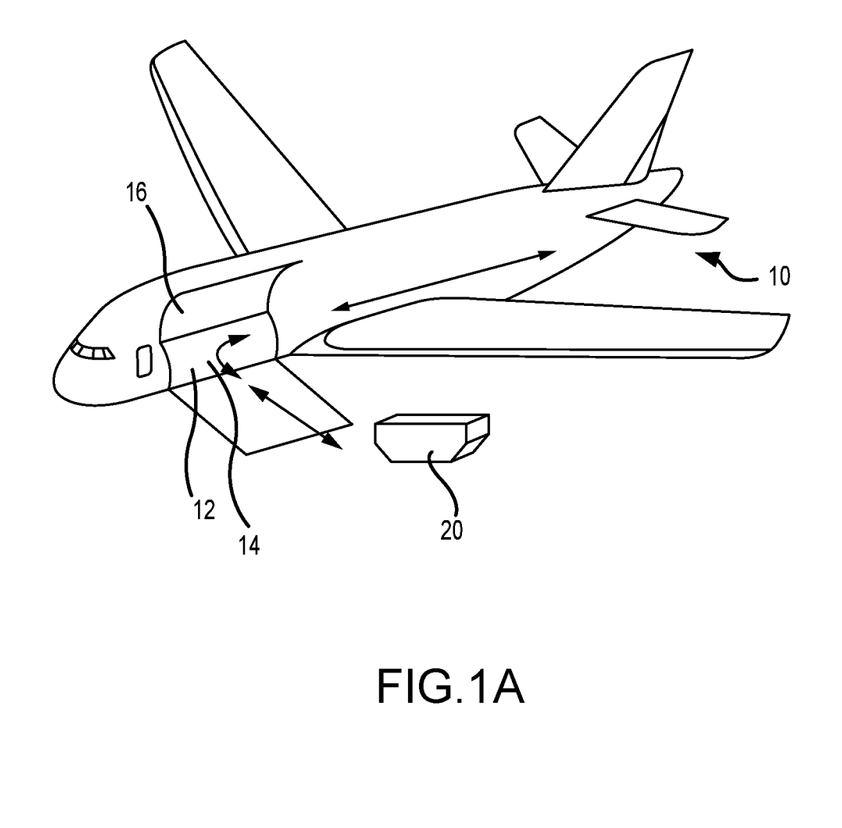
FIG. 1A illustrates a schematic view of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
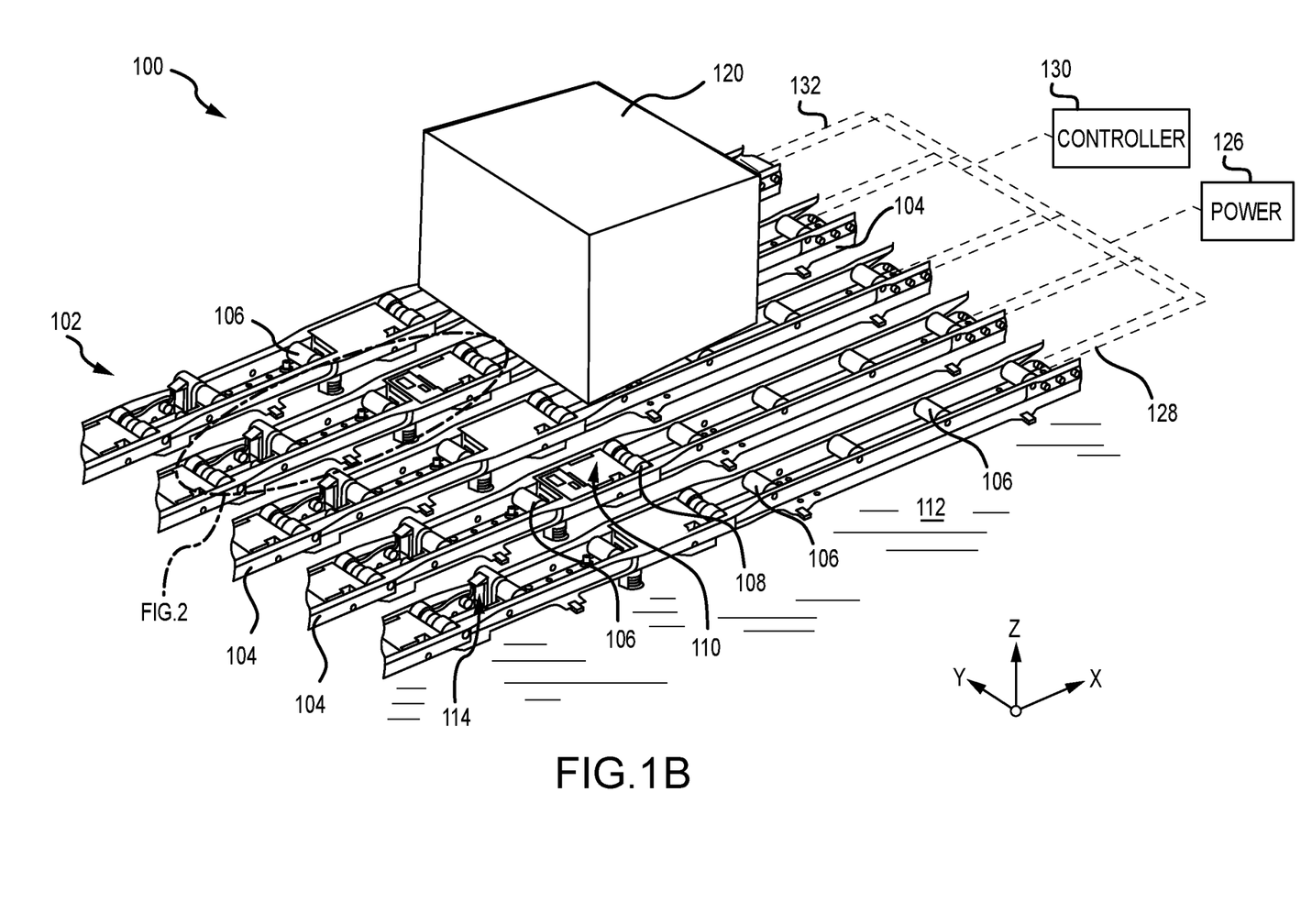
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive rollers 108 that may be actively powered by a motor. In various embodiments, one or more of the plurality of trays 104 is positioned longitudinally along the cargo deck 112—e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. As described below, in various embodiments, the system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
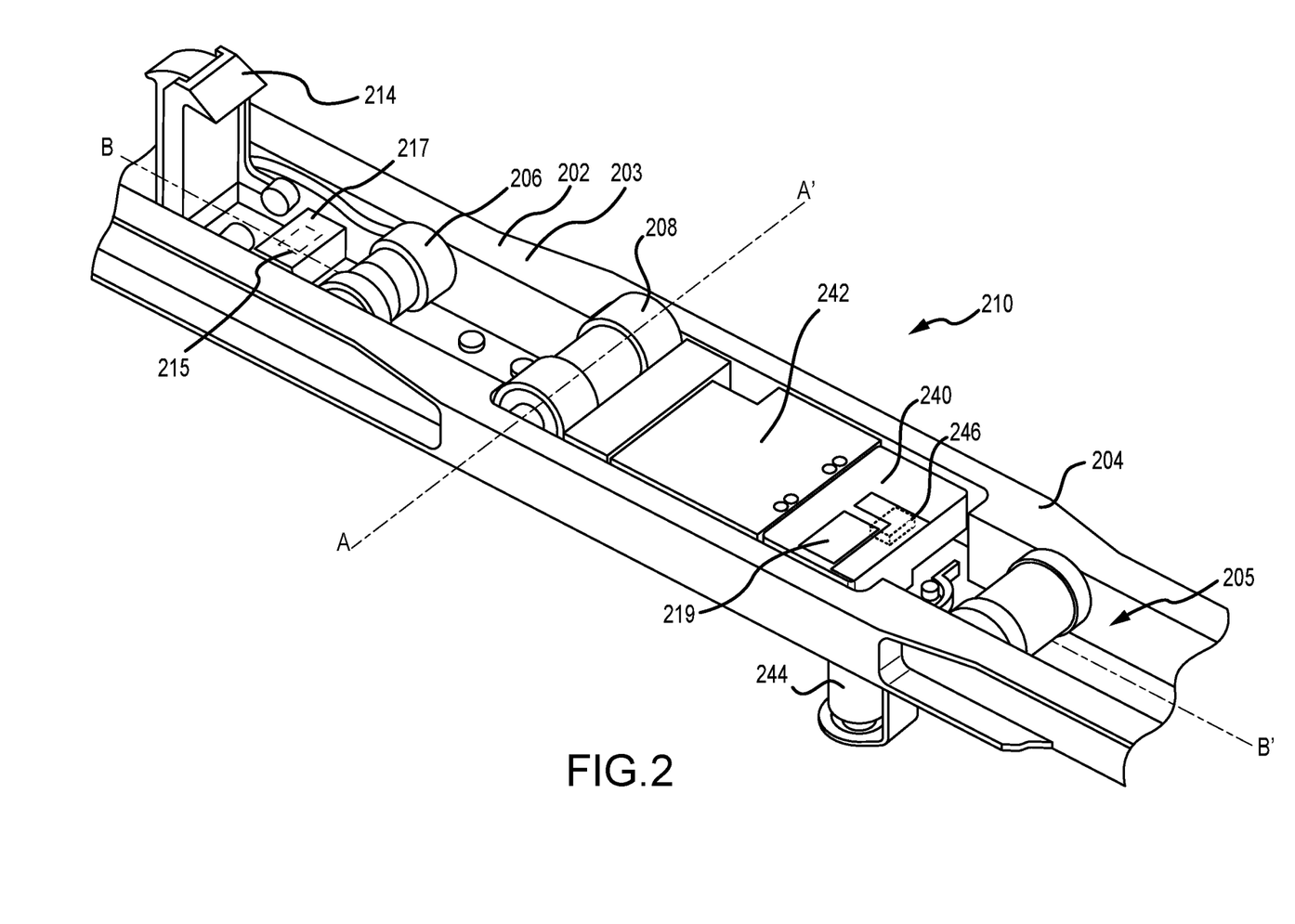
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3A:
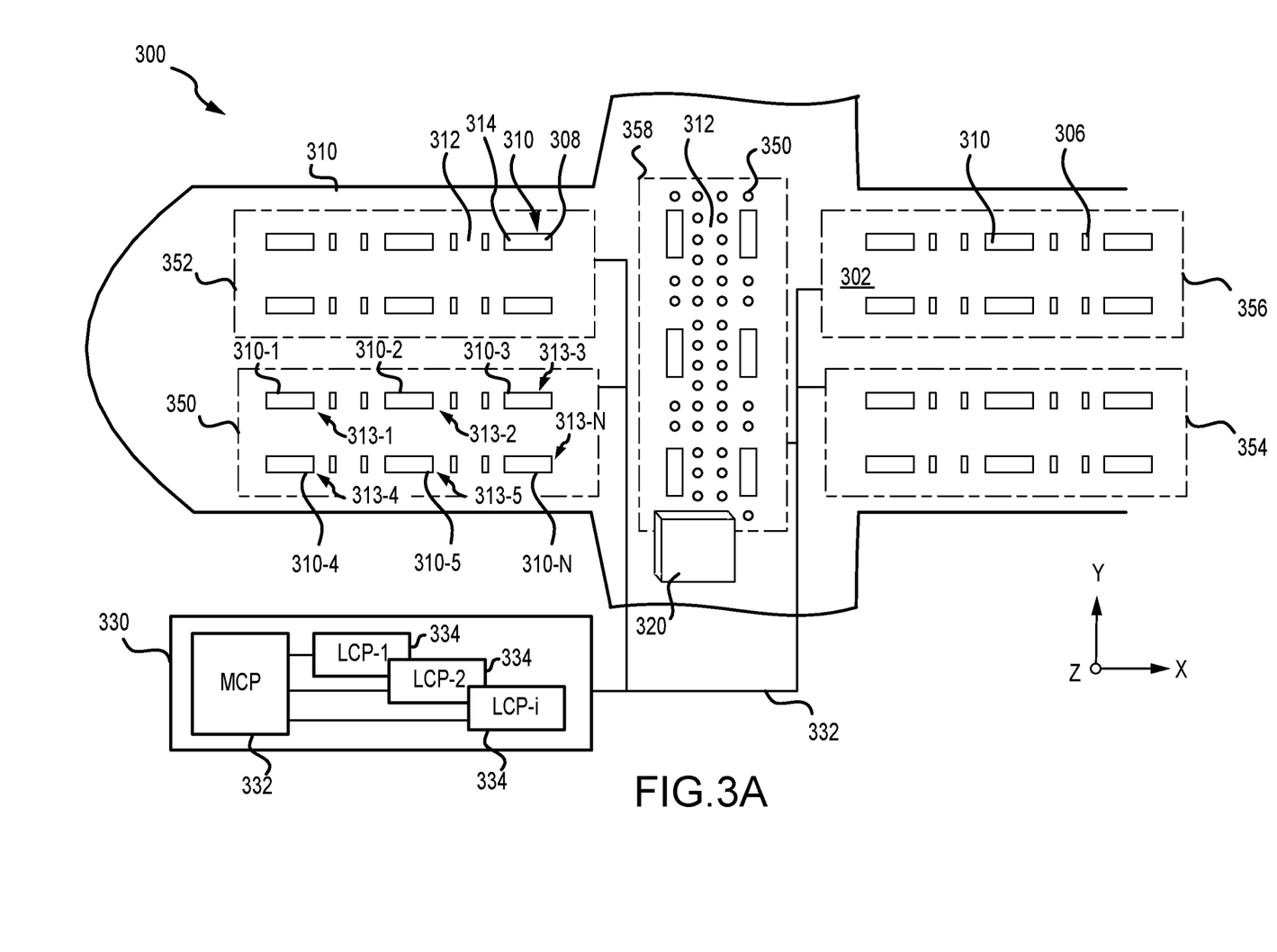
FIGS. 3A and 3B illustrate a schematic view of a cargo deck having a cargo handling system with a plurality of PDUs, in accordance with various embodiments.

Referring now to FIG. 3A, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 351 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 303-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

Figure 3B:
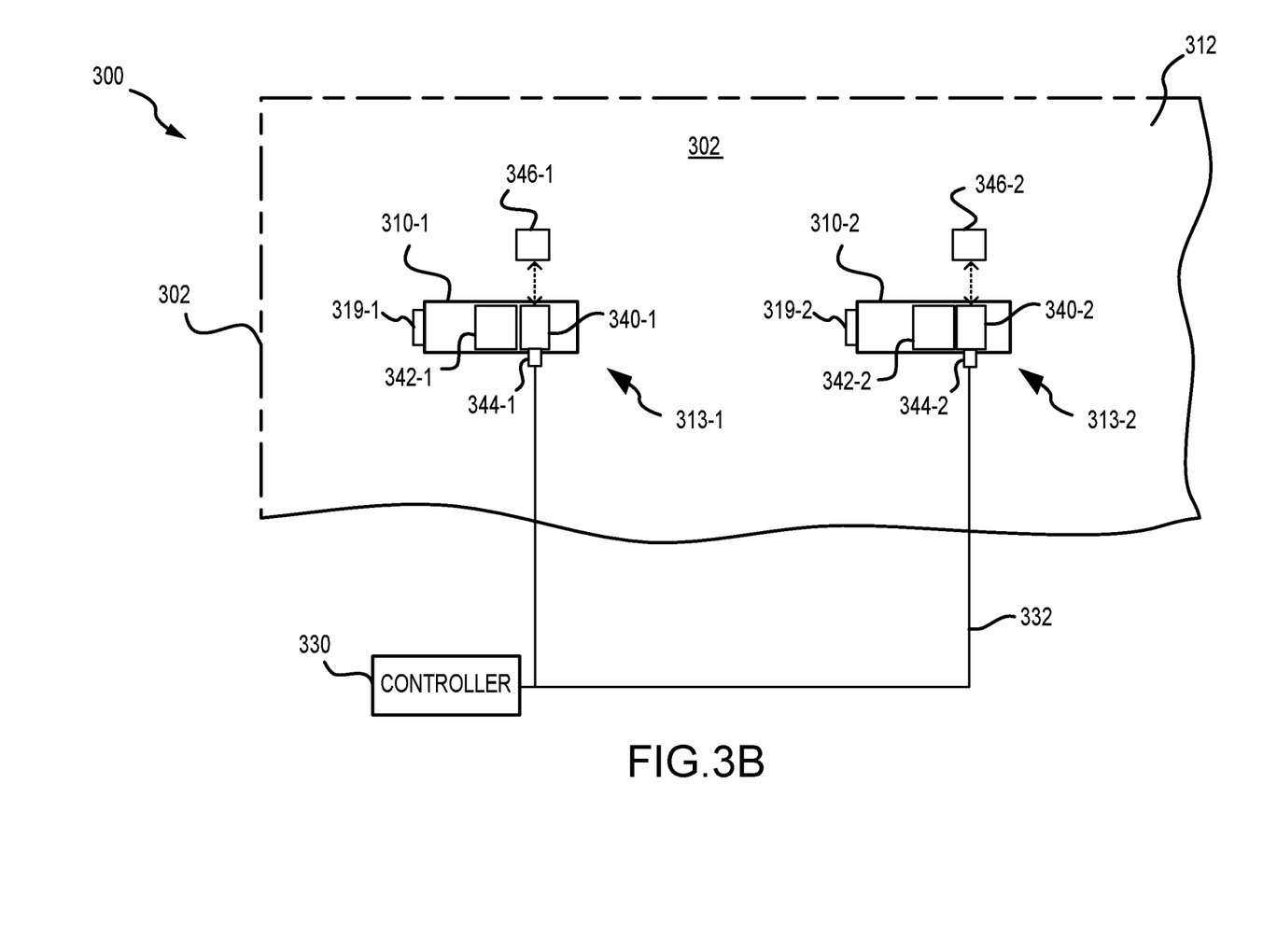

With reference to FIG. 3B, a schematic view of a portion of the cargo handling system 300 and the cargo deck 312 is shown in accordance with various embodiments. By way of non-limiting example, the system controller 330 is configured to send a command signal through the channel 332 to at least the first PDU 310-1 and the second PDU 310-2 of the forward port-side section 350. The command signal may, for example, comprise an instruction to activate or deactivate a first motor 342-1 associated with the first PDU 310-1 or a second motor 342-2 associated with the second PDU 310-2.

The command signal may also comprise a first address that corresponds to the first location 313-1 or a second address that corresponds to the second location 313-2. A first unit controller 340-1 of the first PDU 310-1 may receive the command signal through a first connector 344-1 and a second unit controller 340-2 of the second PDU 310-2 may receive the command signal through a second connector 344-2. Following receipt of the signal, the first unit controller 340-1 and the second unit controller 340-2 may determine whether the command is intended to affect operation of the first PDU 310-1 or the second PDU 310-2, respectively, by comparing a location address contained within the signal to a known address associated with the respective PDUs. In various embodiments, the first address associated with the first PDU 310-1 may be stored in a first RFID device 346-1 and the second address associated with the second PDU 310-2 may be stored in a second RFID device 346-2. Additionally, a ULD sensor, such as, for example, the ULD sensor 219 described above with reference to FIG. 2 may be disposed proximate each PDU and configured to detect the presence of a ULD as the ULD is positioned over or proximate to the PDU. Accordingly, a first ULD sensor 319-1 may be disposed proximate or within the first PDU 310-1 and a second ULD sensor 319-2 may be disposed proximate or within the second PDU 310-2.

Figure 4:
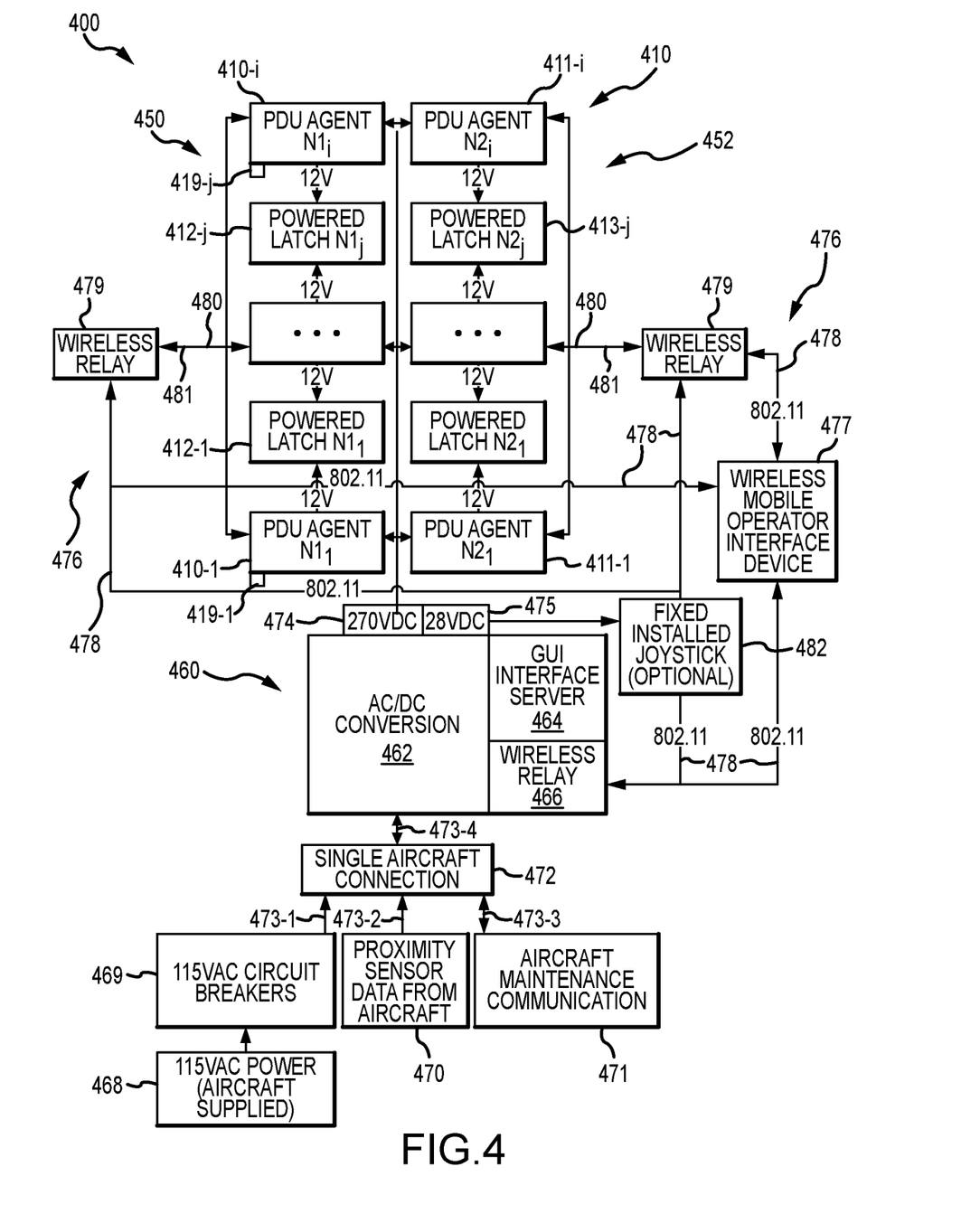
FIG. 4 illustrates an agent-based control system for controlling a cargo handling system, in accordance with various embodiments.

Turning now to FIG. 4, a schematic diagram of an agent-based control system 400 is illustrated, in accordance with the various embodiments. Agent-based, as used herein, indicates that each of a plurality of PDUs includes logic for self-control based on various status indicators concerning the states of surrounding PDUs and the locations of one or more ULDs. As described below, the agent-based control system 400 may be employed to control the loading and unloading of a ULD (e.g., the ULD 320 described above with reference to FIG. 3A) by selectively powering a plurality of PDUs 410 (e.g., the plurality of PDUs 310 described above with reference to FIG. 3A).

In various embodiments, the agent-based control system 400 includes a plurality of PDUs 402, such as, for example, the plurality of PDUs 310 described above with reference to FIG. 3A. In various embodiments, the plurality of PDUs 402 may be arranged in a first section 450 and a second section 452, such as, for example, the forward port-side section 350 and the forward starboard-side section 352, respectively, described above with reference to FIG. 3A. In various embodiments, each PDU comprising the first section 450 includes a PDU Agent. For example, a first PDU 410-1 of the first section 450 includes PDU Agent $N1_1$ and an i-th PDU 410-i of the first section 450 includes PDU Agent $N1_i$. Similarly, in the second section 452, a first PDU 411-1 includes PDU Agent $N2_1$ and an i-th PDU 411-i includes PDU Agent $N2_i$. Also included in the first section 450 and the second section 452 is a series of powered latches. For example, a first powered latch 412-1 (Powered Latch $N1_1$) and a j-th powered latch 412-j (Powered Latch $N1_j$) are arranged in the first section 450 and a first powered latch 413-1 (Powered Latch $N2_1$) and a j-th powered latch 413-j (Powered Latch $N2_j$) are arranged in the second section 452. In various embodiments, a powered latch is positioned between each pair of adjacent PDUs.

The agent-based control system 400 may further include an aircraft power and communication interface 460. In various embodiments, the aircraft power and communication interface 460 includes an AC/DC Conversion module 462, a GUI Interface Server module 464 and a Wireless Relay module 466. The agent-based control system 400 is powered by a power module 468 which, in various embodiments, may comprise a 115V AC power source that may be supplied by the aircraft (e.g., from an auxiliary power unit) or from a source external to the aircraft. The agent-based control system 400 may further include circuit breakers 469, a proximity sensor data module 470 and an aircraft maintenance communication module 471. In various embodiments, the circuit breakers 469 serve to protect the agent-based control system 400 from power surges. The proximity sensor data module 470 is configured to receive sensor data concerning the current state of each of the plurality of PDUs 410 distributed, for example, throughout the first section 450 and the second section 452. The sensor data may, in various embodiments, be transmitted to the aircraft maintenance communication module 471 and then analyzed to determine whether maintenance is required for any of the plurality of PDUs 410. In various embodiments, power from the power module 468 (or circuit breakers 469) and data from the proximity sensor data module 470 and the aircraft maintenance communication module 471 may be provided to the aircraft power and communication interface 460 through a single aircraft connection 472 (e.g., an electrical plug) that combines a power bus 473-1, a proximity sensor data bus 473-2 and an aircraft maintenance communication bus 473-3 into a combined power and data bus 473-4.

The agent-based control system 400 may further include direct current supply interfaces, such as, for example, a high-power DC supply interface 474 and a low-power DC supply interface 475. In various embodiments, the high-power DC supply interface 474 is configured to provide a 270V DC power supply directly to each one of the plurality of PDUs 410 and the low-power DC supply interface 475 is configured to provide a 28V DC power supply to a wireless network 476. In various embodiments, each of the PDU Agents is powered by a 12V DC supply provided by their associated PDU following conversion of the 270V DC power supply to the 12V DC power supply. In various embodiments, the wireless network 476 provides a communication network between the PDU Agents within the plurality of PDUs 410 and one or more operator interface devices, such as, for example, a Wireless Mobile Operator Interface Device (WMOID) 477. In various embodiments, the WMOID 477 comprises a hand-held communication device, such as, for example, a smartphone or tablet device configured to communicate with the PDU Agents over the wireless network 476 through one or more wireless links 478. In various embodiments, one or more wireless relays 479 provide an interface between the WMOID 477 the various PDU Agents through a power line communication bus 480 or a controller area network bus 481. A joystick 482 which, in various embodiments, may be permanently affixed to the aircraft, may provide an optional operator interface to the wireless network 476.

Referring still to FIG. 4, operation of the agent-based control system 400 may be described, in accordance with various embodiments. An operator enters a "goal" using, for example, the WMOID 477. In various embodiments, the goal includes information concerning the location where a particular ULD is to be positioned. The goal is output from the WMOID 477 onto the wireless network 476, received by one or more of the wireless relays 479 and provided to the various PDU Agents via the power line communication bus 480 or the controller area network bus 481. In one non-limiting example, the goal may provide instructions to transport a ULD from a first location corresponding to the first PDU 410-1 of the first section 450 to an i-th location corresponding to the i-th PDU 410-i of the first section 450. In so doing, a series of sensors, including a first sensor 419-1, associated with the first PDU 410-1, and an i-th sensor 419-i, associated with the i-th PDU 410-i, locate the current position of the ULD. In various embodiments, one or more of the series of sensors may comprise the ULD sensor 219 described above with reference to FIG. 2, though other sensors may be employed. If the series of sensors confirm the current position is the first location corresponding to the first PDU 410-1, then the logic within each of the PDU Agents in the first section 450 are employed to activate a first drive roller (e.g., the drive roller 208 described above with reference to FIG. 2) associated with the first PDU 410-1 and deactivate the other drive rollers in the first section 450. As the first drive roller transports the ULD in the direction of the ith PDU 410-i, the ULD will eventually disengage with the first drive roller and engage with a second drive roller associated with a second PDU in the first section 450. At that point, a second sensor associated with the second PDU will detect the presence of the ULD, causing a second PDU Agent to activate the second drive roller and the PDU Agents associated with the remaining PDUs to deactivate the associated drive rollers.

Consistent with the above operational description, the ULD will eventually arrive at the i-th location corresponding to the i-th PDU 410-i of the first section 450. An i-th drive roller then transports the ULD to an i-th restraint device (e.g., the restraint device 214 described above with reference to FIG. 2). The i-th sensor will then detect contact or sufficient proximity between the ULD and the i-th restraint device and then activate the i-th restraint device in order to restrain the ULD in the desired position. In various embodiments, the operation then continues with subsequent ULDs being transported from the first location corresponding to the first PDU 410-1 to the desired location specified in the goal and, upon arrival at the desired location, activation of the appropriate restraint device. While the foregoing describes sequential loading and restraining of a plurality of ULDs into the first section 450, un-restraining and unloading of the plurality of ULDs proceeds in a similar operation, excepting in reverse order.

Figure 5:
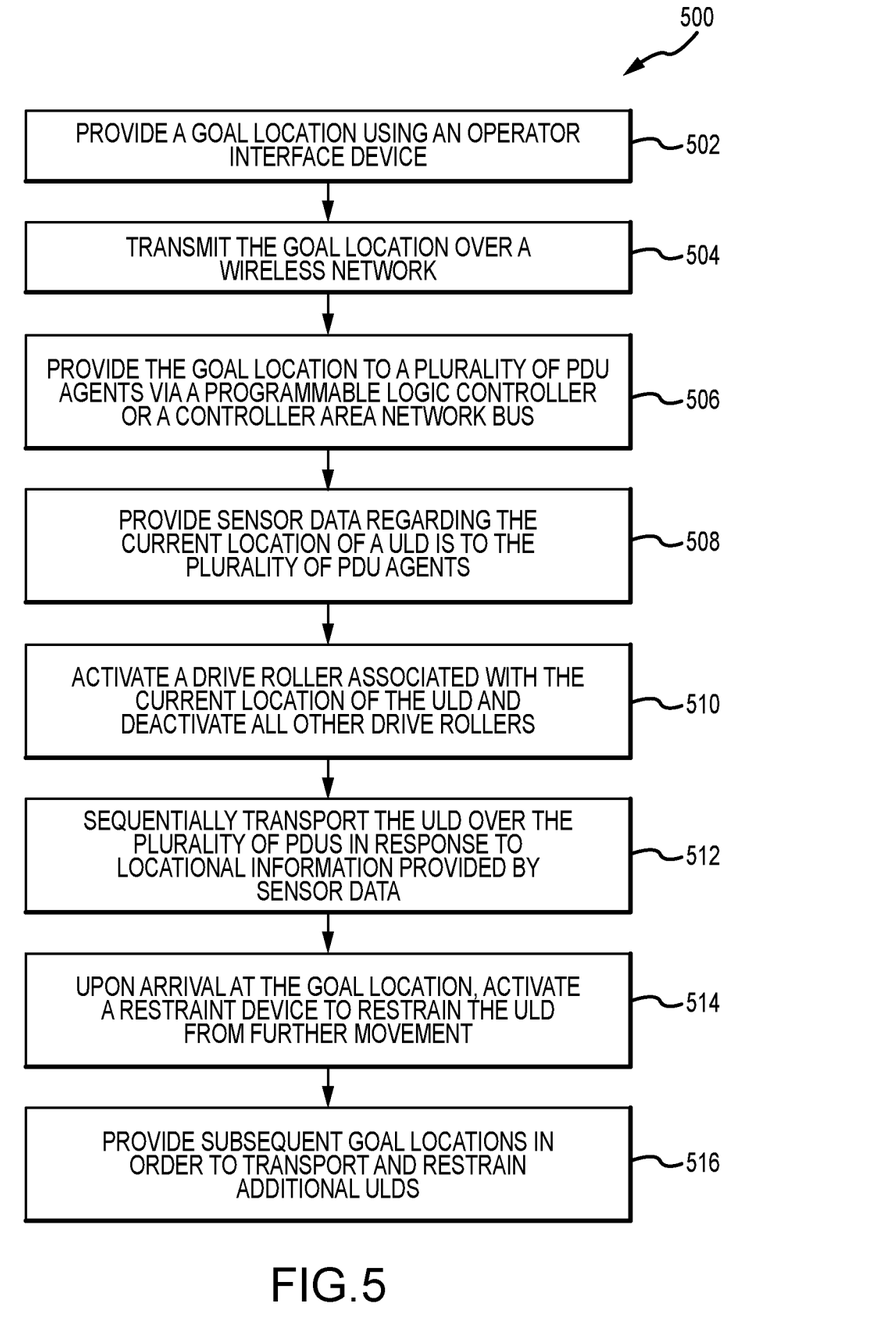
FIG. 5 illustrates a method describing control and operation of an agent-based control system in accordance with various embodiments.

Referring now to FIG. 5, a method 500 describing operation of an agent-based control system, such as, for example, the agent-based control system 400 described above with reference to FIG. 4 is described. In a first step 502, an operator provides a goal to the agent based control system using, for example, a wireless mobile operator interface device. The goal includes a goal location to store and restrain a ULD. In a second step 504, the goal is transmitted over a wireless network and received by a wireless relay. In a third step 506, the goal is provided to a plurality of PDU Agents associated with a plurality of PDUs via a power line communication bus or a controller area network bus, such as, for example, the power line communication bus 480 or the controller area network bus 481 described above with reference to FIG. 4. In a fourth step 508, sensor data regarding the current location of the ULD is provided to the plurality of PDU Agents. In a fifth step 510, the plurality of PDU Agents is employed to activate a drive roller associated with the current location of the ULD and to deactivate the drive rollers corresponding to all other PDUs. In a sixth step 512, the ULD is sequentially transported over the plurality of PDUs to the goal location via the PDU Agents activating and deactivating drive rollers associated with the plurality of PDUs in response to locational information provided by the sensor data. In a sixth step 514, upon arrival at the goal location, the PDU Agents are employed to activate a restraint device to restrain the ULD from further movement.

Finally, in a seventh step 516, subsequent goal locations are provided in order to transport and restrain additional ULDs to such goal locations.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for storing and restraining cargo, comprising:
generating a first goal location to store and restrain a first cargo;
transmitting the first goal location to a plurality of power drive unit agents associated with a plurality of power drive units;
transmitting sensor data regarding a current location of the first cargo to the plurality of power drive unit agents;
activating by a first power drive unit agent of the plurality of power drive unit agents a first drive roller associated with a first one of the plurality of power drive units to move the first cargo toward the first goal location;
activating by a second power drive unit agent of the plurality of power drive unit agents a second drive roller associated with a second one of the plurality of power drive units to move the first cargo toward the first goal location;
sequentially activating subsequent drive rollers associated with subsequent ones of the plurality of power drive units to move the first cargo to the first goal location;
deactivating by the first power drive unit agent the second drive roller;
deactivating by the second power drive unit agent the first drive roller; and
activating by one or more of the plurality of power drive unit agents a first restraint device to restrain the first cargo to the first goal location.

2. The method of claim 1, further comprising generating a second goal location to store and restrain a second cargo; transmitting the second goal location to the plurality of power drive unit agents; activating by one or more of the plurality of power drive unit agents a first drive roller associated with a first one of the plurality of power drive units to move the second cargo toward the second goal location; sequentially activating subsequent drive rollers associated with subsequent ones of the plurality of power drive units to move the second cargo to the second goal location; and activating by one or more of the plurality of power drive unit agents a second restraint device to restrain the second cargo to the second goal location.

3. The method of claim 1, wherein the transmitting the first goal location to the plurality of power drive unit agents associated with the plurality of power drive units includes a wireless network configured to connect a wireless mobile operator interface device and the plurality of power drive unit agents.

* * * * *